May 29, 1945.   T. C. C. DAVENPORT   2,376,905
LATHE CENTER
Filed July 27, 1943   2 Sheets-Sheet 1
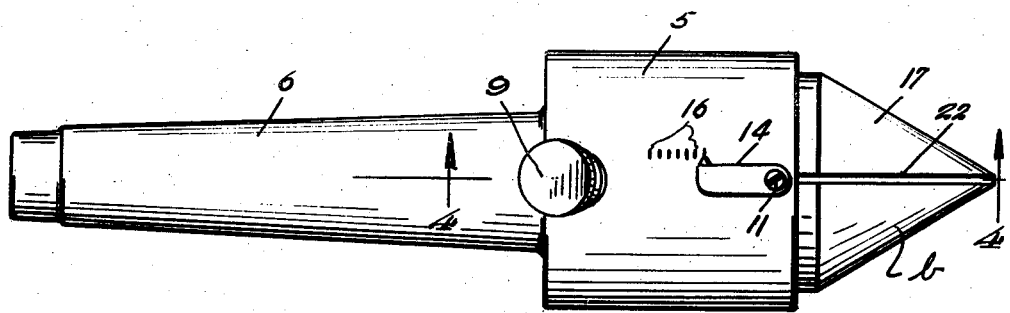
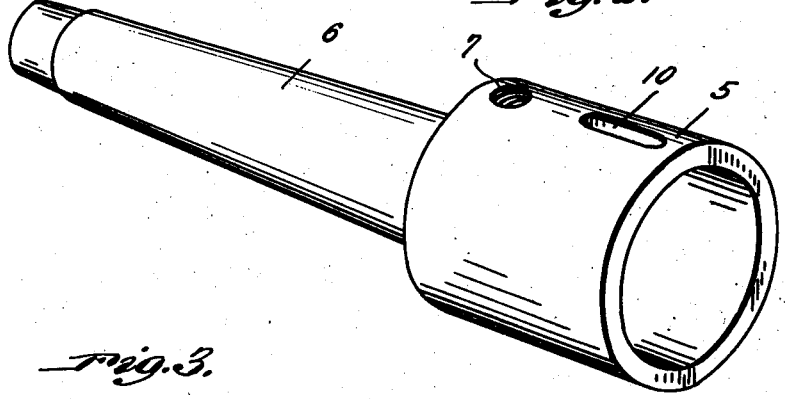
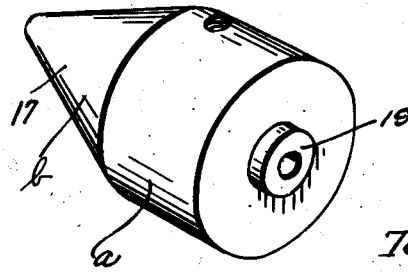
Inventor
Ted C. C. Davenport Patented May 29, 1945

2,376,905

UNITED STATES PATENT OFFICE 2,376,905

LATHE CENTER

Ted C. C. Davenport, Gardena, Calif.

Application July 27, 1943, Serial No. 496,352

1 Claim. (Cl. 82—33)

This invention relates to new and useful improvements in lathe centers, the principal object being to provide a wear compensating and lubricating center which will eliminate wear to a considerable extent and thus eliminate the present requirement of frequent regrinding of the lathe center to obtain a new point.

Other objects and advantages of the invention will become apparent to the reader of the following description.

In the drawings—

Figure 1 represents an elevational view of the center.

Figure 2 is a perspective view showing the cylinder and shank unit.

Figure 3 is a perspective view showing the point element.

Figure 4:
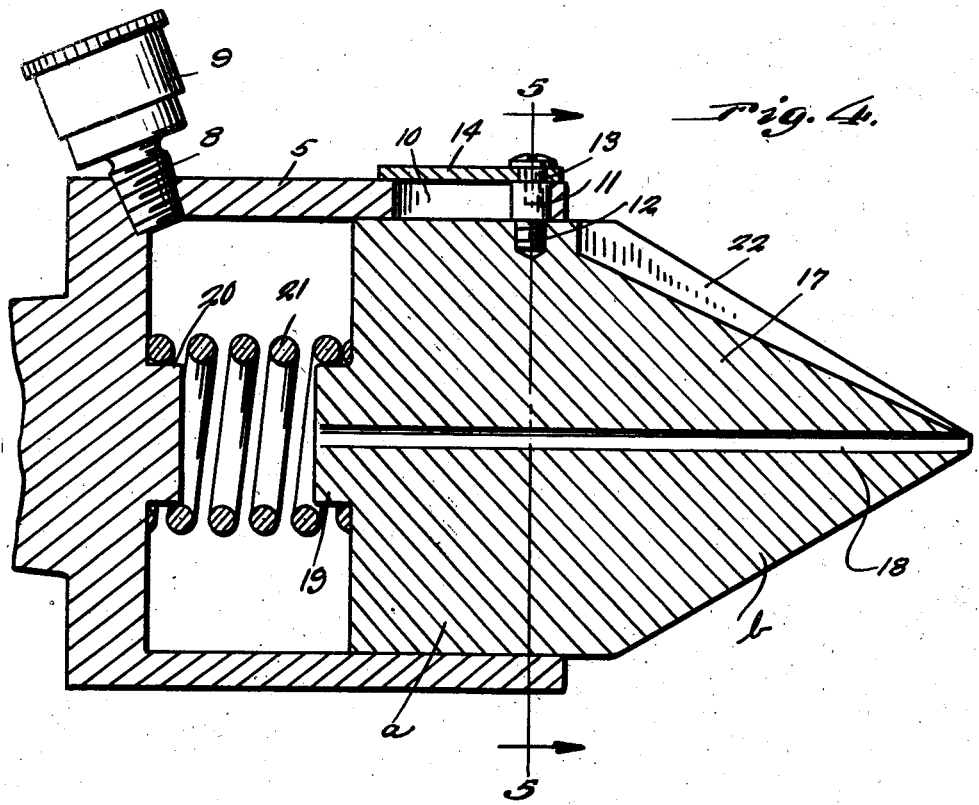
Figure 4 is a fragmentary enlarged sectional view taken on the line 4—4 of Figure 1.
Figure 5:
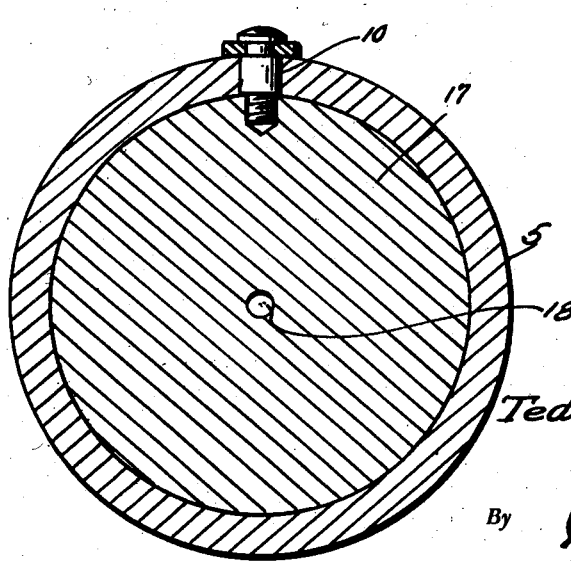
Figure 5 is a cross section on the line 5—5 of Figure 4.
Figure 6:
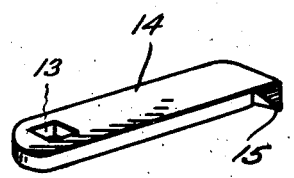
Figure 6 is a perspective view of the gauge member.

Referring to the drawings wherein like numerals designate like parts, it can be seen that the improved lathe center consists of a cylinder 5 having a tapered shank 6 extending therefrom. The inner end of the cylinder 5 has a threaded opening 7 therein for receiving the threaded portion 8 of a lubricant cup 9.

The cylinder 5 has a slot 10 therein for receiving the smooth portion 11 of a threaded pin 12, the pin having a polygonal neck portion disposed through a polygonal-shaped opening 13 in a pointer element 14, this pointer element 14 having a point 15 at its free end adapted to move along certain graduation marks 16 which, of course, serves to provide a measurement for the volume of lubricant left in the cylinder 5. It can be seen, that the pointer element 14 normally closes the slot 10 as is apparent in Figure 4.

Numeral 17 denotes a point element having a cylindrical portion $a$ and a tapered portion $b$, and a lubricant duct 18 extends longitudinally through this point element from its inner end to its apex, the same passing through a teat 19 at the inner end thereof which is opposed to a teat 20 located on the inner end of the cylinder 5. These teats 19, 20 project into the end convolutions of a spring 21.

A lubricant outlet groove 22 extends longitudinally along the face of the tapered portion $b$ of the point element 7 as is clearly shown in Figure 4. Obviously, the shank 6 is attached to the lathe, while the point or tapered portion $b$ of the point element 17 engages the work (not shown).

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A lathe center comprising a cylinder having a lathe attachable shank, a plunger in the cylinder having an external work-engageable point, and a spring in the cylinder for urging the plunger outwardly, a lubricant inlet for the cylinder and a volume indicating device operatively provided between the plunger and the cylinder, said indicating device consisting in the provision of an indicating element on the plunger and graduations on the cylinder along which the indicating element moves as it is carried by the plunger.

TED C. C. DAVENPORT.